Aug. 7, 1945.     G. L. DIMMICK     2,381,728
INTERFEROMETER
Filed March 31, 1942

Inventor
Glenn L. Dimmick
By C. D. Tuska
Attorney

Patented Aug. 7, 1945

2,381,728

UNITED STATES PATENT OFFICE 2,381,728

INTERFEROMETER

Glenn L. Dimmick, Indianapolis, Ind., assignor to Radio Corporation of America, a corporation of Delaware Application March 31, 1942, Serial No. 436,997

3 Claims. (Cl. 88—14)

This invention relates to an improved type of interferometer having higher light intensities and greater contrasts when used with white light than those previously used.

In interferometers constructed in accordance with the prior art, it has been customary to reflect light between two optical surfaces which were either left unsilvered or were half-silvered so that each surface would transmit approximately fifty percent of the incident light. Such devices had the inherent disadvantages that their range was quite limited when used with white light, and it was necessary to use them in a dark room if a source of monochromatic light was used.

In my improved interferometer, I substitute selectively reflecting surfaces for the half-silvered surfaces used in the prior art. These have the advantage that they may be made to reflect light of a specified wave length, they are highly efficient reflectors for light of that wave length, and the surfaces as constructed are substantially as free from chemical action and physical damage as the usual optical elements themselves.

One object of the present invention is to provide an improved interferometer.

Another object of the invention is to provide an improved type of interferometer plate which will be highly reflective of light of only certain wave lengths.

Another object of the invention is to provide an improved interferometer in which the reflective surfaces do not tarnish and are not readily damaged.

Other and incidental objects of the invention will be apparent from a reading of the following specification and an inspection of the accompanying drawing, in which.

Figure 1:
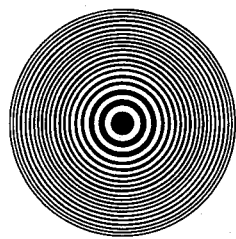
Fig. 1 is a top view of an interference device of the Newton type.

Referring first to Fig. 1, the arrangement of interference rings shown is that which customarily appears when a substantially flat surface is placed in contact with a slightly curved surface, the relative curvature of the surface being the number of half wave lengths corresponding to the total number of rings. With unsilvered glass surfaces, and in white light, these rings appear as colored fringes, and in monochromatic light they appear as alternate bright and dark fringes. If the surfaces are lightly silvered or aluminized, the intensity of the fringes becomes considerably greater, but their characteristics are not otherwise changed.

Figure 2:
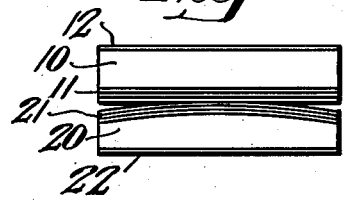
Figure 2 is a side view of the interference device of Fig. 1, showing the arrangement of the coatings and curvatures greatly exaggerated.

In the arrangement shown in Fig. 2, the two abutting faces of the optical elements are coated with selectively reflecting coatings, hereinafter described in greater detail. As shown in this figure, the upper flat member 10 has a three-layer coating on its lower surface 11, which is so constructed as greatly to increase its reflection for a selected wave length; while, if desired, its upper surface 12 may be provided with a coating reducing the reflection and thereby increasing the light transmission for the same wave length. The lower member 20 likewise has its upper surface coated, as indicated at 21, with a similar selectively reflecting coating, while its lower surface may be provided at 22 with a reflection reducing coating similar to that shown at 12.

If the selectively reflecting coatings 11 and 21 are made to reflect an orange or gold color, and to transmit blue, the interference fringes, whether by transmitted or reflected light, and without the use of any light filter, will appear to be predominantly red and green. If, however, the interference fringes are observed by transmitted light through a red filter, they will appear to be alternately light and dark and their intensity will be greatly increased. The effect produced is much greater than that produced by metallic films, as the selectively reflective films have no absorption.

Figure 3:
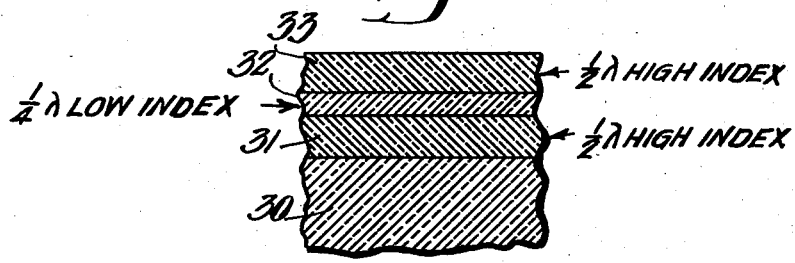
Figure 3 is a greatly magnified view through the selectively reflective coating used in each of the other figures.

The construction of the selectively reflecting film is preferably as illustrated in Fig. 3, in which 30 represents a portion of the body of the interferometer plate, which may, as usual be composed of ordinary crown glass or any of the other available materials of appropriate index of refraction and rigidity. On the surface of the body 30 there is placed a layer 31 having a high index of refraction and a thickness of one-half the wave length of the light to be transmitted through the body. For example, if the light to be transmitted through the body 30 is blue, the light to be reflected from its surface will be reddish or golden and the layer 31 will be made of a thickness of a half wave length of the blue.

The layer 31 may be composed, for example, of zinc sulphide, which has a sufficiently high index of refraction for the purpose. Over the layer 31 there is placed a quarter wave length layer 32 of low index material such, for example, as calcium fluoride or calcium fluoride-aluminum fluoride eutectic, as described and claimed in my application Serial No. 432,836, filed February 28, 1942, and over this there is coated a half wave length layer 33 of high index material similar to the layer 31. This layer 33, like the layer 31, may be of zinc sulphide or analogous high index material. The theory involved in the operation of these selective reflectors is described in detail in my article entitled "A new dichroic reflector and its application to photocell monitoring systems," published in the Journal of the Society of Motion Picture Engineers for January, 1942, at page 36.

Figure 4:
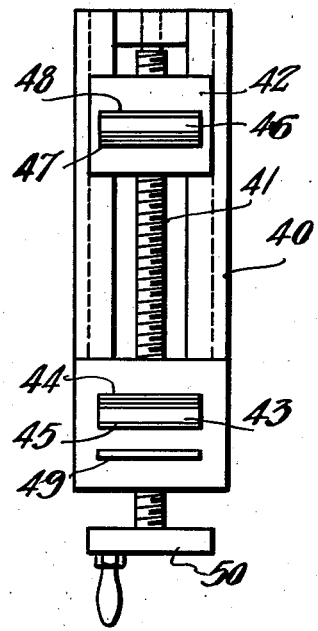
Figure 4 is a plan view of a Fabry and Perot type of interferometer embodying the invention.

In the interferometer shown in Fig. 4, the customary base 40 is provided, having a feed screw 41 and slide 42 which may be actuated by rotating the feed screw 41 by means of the hand wheel 50. On the forward portion of the base 40 there is mounted a stationary reflector 43 which has its rear face 44 provided with the selectively reflecting coating shown in Fig. 3, while its front face 45 is provided with a one-quarter wave length coating similar to the coating 32, to reduce reflection from this surface to a minimum. On the slide 42 there is provided a second reflector 46, having its face 47 which is toward the reflector 43 provided with a selectively reflecting coating such as shown in Fig. 3 and reflective of light of the same wave length as the coating 44 on the reflector 43. The rear face 48 of the reflector 46 may be provided with a reflection reducing coating similar to the reflection reducing coating 45 on the front of the reflector 43.

A color filter 49 may be supported on the base 40 at some appropriate position in relation to the light path. Although this color filter is shown at a location between the member 43 and the observer, it will be apparent that it may be located at any other point in the path of the light beam, and will produce substantially the same effect. This color filter preferably has a high transmission for light of the color predominantly reflected by the surfaces 44 and 47, and a low transmission for complementary colors.

This interferometer will produce fringes of the types usually seen with such devices, differing therefrom in the intensity and contrast of the fringes produced, because of the high reflectivity and low absorption qualities of the coatings used.

It will be apparent to those skilled in the art that the use of this type of interferometer is not limited to either of the specific varieties shown, but that it is of particular utility wherever high light intensities are desired. For example, it has been proposed to use interferometers for modulating light in accordance with sound waves, either for sound recording or for transmitting the light to photoelectric devices for producing modulated electrical impulses from sound waves or from phonograph records, and an interferometer of the type described above is particularly applicable to such purposes where light intensities are to be modulated. It has heretofore been proposed to use piezoelectric crystals to modulate light by interference, and in this instance the selectively reflective coatings could be placed on the opposite faces of such crystals.

I claim as my invention:

1. An interferometer including a pair of transparent members provided with surfaces arranged to face one another, a pair of high index layers superimposed on each of said surfaces and each having a thickness of one-half the wave length of the light to be transmitted through said members, and a low index layer interposed between each pair of high index layers and having a thickness one-fourth the wave length of said light.

2. An interferometer including a pair of confronting light-reflecting surfaces and selectively reflecting coatings on said surfaces, said coatings consisting of a pair of high index layers, each of said layers having a thickness of one-half of a predetermined wave length of light, and a low index layer interposed between said high index layers and having a thickness of one-quarter of said wave length.

3. An interferometer including a pair of transparent members with confronting surfaces, a pair of high index layers superimposed on each of said surfaces and each having a thickness of one-half the wave length of light to be transmitted through said members, a low index layer interposed between each pair of said high index layers and having a thickness of one-quarter of said wave length, and reflection-reducing coatings on the obverse surfaces of each of said members.

GLENN L. DIMMICK.